P. MILLER.
Machine for Pressing Cloth.

No. 228,375.                    Patented June 1, 1880.

Attest:
J. Henry Kaiser.
William S. Congdon.

Inventor:
Philip Miller

UNITED STATES PATENT OFFICE.

PHILIP MILLER, OF NORWICH, CONNECTICUT.

MACHINE FOR PRESSING CLOTH.

SPECIFICATION forming part of Letters Patent No. 228,375, dated June 1, 1880.

Application filed January 17, 1880.

*To all whom it may concern:*

Be it known that I, PHILIP MILLER, of Norwich, New London county, Connecticut, have invented a new and useful Improvement in Machines for Pressing Cloth, of which the following is a specification.

My invention relates to that class of machines for pressing cloth which employ a steam-heated bed, over which a solid or hollow steam-heated roller forces the woolen, flannel, or other cloths; and it consists in the combination, with a steam-heated box, of a glass surface and an interposed yielding cushion, as hereinafter claimed.

In the accompanying drawings, like letters of reference indicate like parts.

Figure 1:
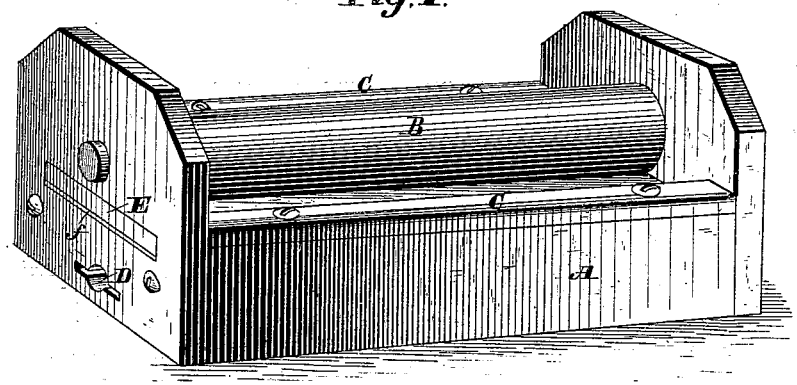
Figure 2:
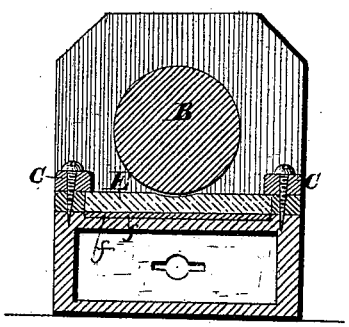

Figure 1 is a perspective view of enough of a pressing-machine to fully illustrate my invention. Fig. 2 is a vertical cross-section of Fig. 1 at any point along the length of the roller.

A is a hollow box, and D a slotted opening, to which a steam-pipe is secured. E is a glass bed, placed directly over the steam-heated box, and *f* is a thin sheet of lead underneath the glass. This, being a yielding material, saves the glass from breaking whenever too great or unequal pressure is made.

Rubber or any yielding material, or felt or springs may be used in place of lead, it only being necessary that the bed should slightly yield, rather than break.

B is the roller, which may be of any well-known sort, and either solid, as shown by my illustration, or hollow, and heated by steam. This, of course, is immaterial to my invention.

The glass bed, which is hollowed out to register with the convex surface of the roller, is separate from the box, and secured thereto by strips C.

I have found in the extensive use of presses of the sort of which mine is an improvement that now and then the metal (usually brass) rusts and soils a piece of very light-colored and expensive cloth, and now and then the brass becomes indented, and this presses the cloth irregularly.

The upper part of the bed being of glass, is firm, keeps the line of impression even, and will stand long wear. From the nature of the material it is easily kept clean.

I am, of course, well aware that my apparatus for pressing is generally a well-known one.

What, therefore, I claim as my invention is—

1. In a cloth-pressing machine, the combination, with a hollow steam-heated box and a glass bed or surface thereon, of a yielding cushion interposed between said box and bed, substantially as described.

2. In a cloth-pressing machine, the combination of a hollow steam-heated box, a glass bed or surface thereon, and an interposed sheet of lead to give said bed a slight yielding capacity, all arranged as and for the purposes set forth.

PHILIP MILLER.

Witnesses:
   W. S. CONGDON,
   HENRY H. BURNHAM.